United States Patent
Takashima

(10) Patent No.: US 6,880,061 B2
(45) Date of Patent: Apr. 12, 2005

(54) SYSTEM AND METHOD FOR MONITORING DATA, COMPUTER PROGRAM AND DATA STORAGE THEREFOR

(75) Inventor: Shinji Takashima, Kanagawa (JP)

(73) Assignee: Sony Computer Entertainment Inc. (JP)

(*) Notice: Subject to any disclaimer, the term of this patent is extended or adjusted under 35 U.S.C. 154(b) by 158 days.

(21) Appl. No.: 10/113,746

(22) Filed: Apr. 1, 2002

(65) Prior Publication Data

US 2002/0162054 A1 Oct. 31, 2002

(30) Foreign Application Priority Data

Mar. 30, 2001 (JP) ..................................... P2001-098317
Feb. 28, 2002 (JP) ..................................... P2002-052965

(51) Int. Cl.⁷ ............................................. G06F 12/00
(52) U.S. Cl. ..................... 711/200; 711/162; 714/40; 714/50
(58) Field of Search ................................ 711/200, 162; 714/40, 50; 707/202, 204; 710/300

(56) References Cited

U.S. PATENT DOCUMENTS

| | | | | |
|---|---|---|---|---|
| 6,035,412 A | * | 3/2000 | Tamer et al. ................. | 714/6 |
| 6,378,025 B1 | * | 4/2002 | Getty ......................... | 710/300 |
| 6,502,205 B1 | * | 12/2002 | Yanai et al. ................. | 714/7 |

FOREIGN PATENT DOCUMENTS

| | | |
|---|---|---|
| JP | 59-016001 A | 1/1984 |
| JP | 59-148917 A | 8/1984 |
| JP | 2-27231 U | 2/1990 |
| JP | 04-365142 A | 12/1992 |
| JP | 08-083201 A | 3/1996 |
| JP | 10-307763 A | 11/1998 |
| JP | 11-134224 A | 5/1999 |

* cited by examiner

Primary Examiner—Mano Padmanabhan
Assistant Examiner—Thang Ho
(74) Attorney, Agent, or Firm—Lerner, David, Littenberg, Krumholz & Mentlik, LLP

(57) ABSTRACT

To provide a system for monitoring data transmitted between parts of an electronic machine. The system includes a mirror memory circuit that is subjected to writing and reading of data in the same manner as a memory circuit based on first data to be supplied from a memory controller to a memory circuit, and a signal sampling circuit that stores in a sampling memory circuit the first data as well as second data read out of the mirror memory circuit. The sampling memory circuit stores exact copies of the first data supplied from the memory controller to the memory circuit and exact copies of the second data supplied from the memory circuit to the memory controller. Therefore, it is possible to monitor the data transmitted between the memory controller and the memory circuit.

15 Claims, 8 Drawing Sheets

SYSTEM AND METHOD FOR MONITORING DATA, COMPUTER PROGRAM AND DATA STORAGE THEREFOR

CROSS-REFERENCE TO RELATED APPLICATIONS

The present application claims priority from Japanese Application Nos. 2001-98317 filed Mar. 30, 2001 and 2002-52965 filed Feb. 28, 2002, the disclosures of which are hereby incorporated by reference herein.

BACKGROUND OF THE INVENTION

The present invention relates to a technique for allowing accurate monitoring of the data transmitted among parts of an electronic machine where a processor(s), a memory circuit(s) and/or other parts of the electronic machine are interconnected through transmission lines.

Recent advancements in highly integrated single-chip semiconductor devices have made it possible to provide faster processing of more data. Semiconductor devices have thus found wide applications in various fields, and many products have been developed incorporating such semiconductor devices.

Some instances involving data processing within a semiconductor device require monitoring of the data streams through the device in order to, for example, check how efficiently the resources of the semiconductor device are utilized. More specifically, it may be better to monitor the reading and writing of data to and from a memory circuit (hereinafter, referred to as "access" to the memory circuit) under the control of a processor in the course of development of a software product, especially when the software product is expected to operate in cooperation with the semiconductor device. In such cases, knowledge about what data has been written in which location of which memory circuit and are read at what timing enables software developers to check how efficiently the memory circuit is being utilized.

When data is transmitted at high speeds with a semiconductor device operating at higher clock frequencies, terminating resistance should ideally equal the characteristic impedance of the transmission line in order to reduce effects of reflections. A proper impedance match is also important to obtain accurate results of monitoring. On the other hand, higher integration of the semiconductor circuit results in an increasing number of input and output terminals of the semiconductor device. Accordingly, it becomes more and more difficult to provide line termination circuits at all ends of all transmission lines. In addition, the semiconductor device consumes more power as the number of line termination circuits increases.

In light of these circumstances, transmission lines terminated at only one end have been used increasingly. For example, for the transmission line interconnecting a processor and a memory circuit, termination is typically placed only on the memory circuit. One reason for this is that placement of the termination adjacent to or within reasonable proximity to the processor is usually difficult due to the processor's relatively larger number of input/output terminals compared to those of the memory circuit.

However, the termination on one end will cause reflections from the non-terminated end and, consequently, the deformation of waveforms. The reflections affect the accuracy of monitoring when an attempt to monitor the data that comes from the terminated end is made in the vicinity of the line termination circuit. A possible solution for the problem of the reflection is to monitor the data near the non-terminated open end. The monitoring itself can be made on the open end with a doubling of the amplitude of the data but this solution is not feasible for the non-terminated ends where there is not enough physical space for a line termination circuit. In such a case, it becomes virtually impossible to monitor the data on the transmission line.

Therefore, an object of the present invention is to provide a technique for allowing accurate monitoring of the data transmitted among a plurality of parts of an electronic machine, which otherwise is difficult or virtually impossible.

SUMMARY OF THE INVENTION

In order to achieve the above-mentioned objects, the present invention provides a system and a method for monitoring data, and a recording medium recorded with a computer program for use in monitoring data.

One aspect of the present invention is a system for monitoring data transmitted between first and second components of an electronic machine, the first and second components being connected to one another by a transmission line having a terminated end connected to the second component and a non-terminated end, the system including a mirror component that operates in the same manner as the second component; a data storage unit operable to store incoming data in chronological order; and a transfer unit. The transfer unit is operable to receive first data transmitted from the first component to the second component and to transfer the first data to the mirror component and the data storage unit. The transfer unit also receives second data supplied from the mirror component and transfers the second data to the data storage unit. Since the mirror component operates in the same manner as the second component, the data storage unit sequentially holds data equivalent to that transmitted between the first component and the second component. It becomes easy to monitor the data transmitted on a transmission line having a single terminated end by means of reading the data as desired and appropriate, which otherwise is difficult to monitor.

The transfer unit and the mirror component are connected through a transmission line that is terminated at the end where the mirror component is present and non-terminated at the other end. Accordingly, the waveforms of the data from the mirror component can be monitored accurately on the side of the transfer unit.

In a preferred aspect of the present invention, the monitoring system further includes a data analyzing unit operable to analyze the data stored in the data storage unit. In this case, the transfer unit is operable to read data out of the data storage unit and to send the read data to the data analyzing unit in response to a request from the data analyzing unit.

In addition, the mirror component is operable to supply the second data to the transfer unit in synchronization with the transmission of data from the second component to the first component.

Another aspect of the present invention is a system for monitoring data transmitted between first and second components of an electronic machine, the first and second components being connected to one another by a transmission line having a terminated end connected to the second component and a non-terminated end, the system including a mirror component that operates in the same manner as the second component; a data storage unit operable to store incoming data in chronological order; a data analyzing unit operable to analyze the data stored in the data storage unit; and a transfer unit interconnecting the electronic machine, the mirror component, the data storage unit and the data analyzing unit.

The transfer unit is operable to supply to the mirror component and the data storage unit data transmitted from the first component to the second component, to supply to the data storage unit data supplied from the mirror component, and to supply to the data analyzing unit the data stored in the data storage unit.

In a preferred aspect of the present invention, the mirror component is operable to supply data to the transfer unit in synchronization with the transmission of data from the second component to the first component.

Yet another aspect of the present invention is a method for monitoring data, including providing a transmission line having a terminated end and a non-terminated end; providing a first component connected to the non-terminated end of the transmission line; providing a second component connected to the terminated end of the transmission line; providing a transfer unit at the terminated end of the transmission line, the transfer unit being operable to interconnect a mirror component, a data storage unit, and a data analyzing unit, the mirror component being operated in the same manner as the second component, the data storage unit being operable to store incoming data in chronological order, and the data analyzing unit being operable to perform an analysis of the data stored in the data storage unit; transmitting data from the first component to the second component; supplying the transmitted data through the transfer unit to the mirror component and the data storage unit; supplying data produced from the mirror component to the data storage unit; reading the data stored in the data storage unit; supplying the read data to the data analyzing unit; and analyzing the read data.

A still further aspect of the present invention is a method for monitoring data transmitted between a first component of an electronic machine and a storage component of the electronic machine, the first component and the storage component being connected to one another by a transmission line having a terminated end connected to the storage component and a non-terminated end, the method including transmitting data from the first component to the storage component; supplying the transmitted data to a first storage unit which operates in the same manner as the storage component and to a second storage unit; supplying data produced from the first storage unit to the second storage unit; and analyzing the data stored in the second storage unit.

Yet a further aspect of the present invention is a recording medium recorded with a computer program for causing a computer carry out steps, the computer being connected to a transmission line having a terminated end and a non-terminated end, the transmission line being connected to a first component at the non-terminated end thereof and to a second component at the terminated end thereof, the computer being present at the terminated end of the transmission line, the computer being connected to a mirror component, a data storage unit, and a data analyzing unit, the mirror component being operated in the same manner as the second component, the data storage unit being operable to store incoming data in chronological order, and the data analyzing unit being operable to analyze the data stored in the data storage unit, the computer program causing the computer to carry out the steps of supplying to the mirror component and the data storage unit data transmitted from the first component to the second component; supplying to the data storage unit data produced from the mirror component; and supplying the data stored in the data storage unit to the data analyzing unit. Such program is typically stored on a computer-readable recording medium and installed in the computer during the configuration of the system.

BRIEF DESCRIPTION OF THE DRAWINGS

The above and still further objects, features and advantages of the present invention will become apparent upon consideration of the following detailed description of a specific embodiment thereof, particularly when taken in conjunction with the accompanying drawings in which.

DETAILED DESCRIPTION

The present invention may be applied to an electronic machine for the development of software products that are intended or expected to operate in cooperation with a plurality of parts of the electronic machine. The term "parts of an electronic machine" as used herein refers to all configuration components of an electronic machine, such as a computer, which include single-chip devices and other similar devices. Electronic machines used for development purposes often require sequential monitoring of the data transmitted among parts thereof in the course of development of the software products. A monitoring system according to the present invention may be implemented as a function of such electronic machines for the development of software products.

<Configuration of the Electronic Machine>

Figure 1:
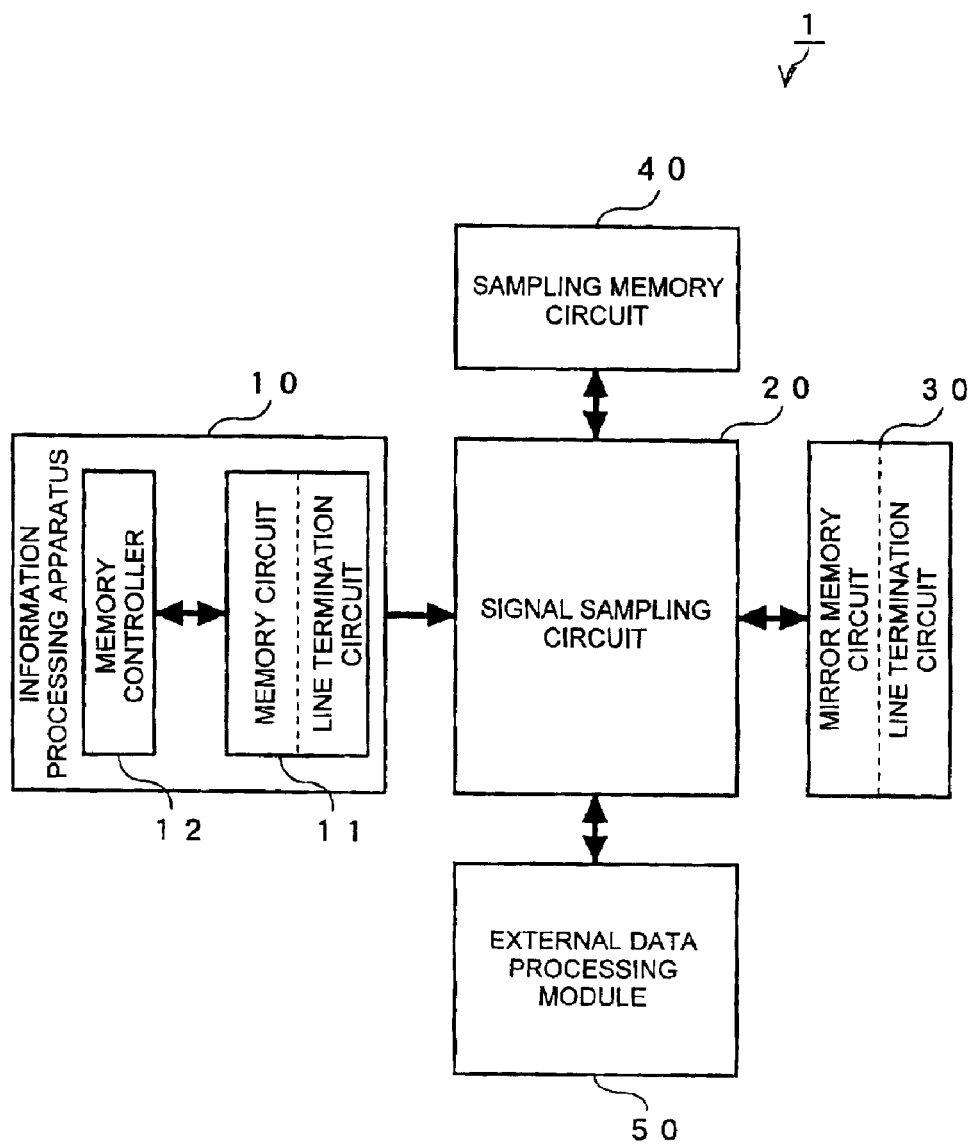
FIG. 1 is a block diagram illustrating a configuration of an electronic machine for the development of software products to which the present invention is applied.

FIG. 1 is a block diagram illustrating a schematic configuration of an electronic machine for the development of software products to which the present invention is applied. The electronic machine 1 for the development of software products comprises a signal sampling circuit 20 which is connected to an information processing apparatus 10, a mirror memory circuit 30, a sampling memory circuit 40, and an external data processing module 50.

The information processing apparatus 10 is where a subject software product is created and run. The information processing apparatus 10 comprises a memory circuit 11 formed of a random access memory (RAM), and a memory controller 12 which accesses the memory circuit 11. The memory circuit 11 is the place where programs and data in current use are kept so that they can be quickly reached by the information processing apparatus 10. Specific examples of the memory controller 12 include those acting as the read/write interface with the memory circuit 11, such as central processing units (CPUs), direct memory access controllers (DMACs), and memory interface circuits provided between these parts and the memory circuit 11. The transmission line between the memory circuit 11 and the memory controller 12 is terminated at only one end. More specifically, termination is placed only on the memory circuit 11.

The memory controller 12 sends, for example, a write address/control signal, written data, and a read address/control signal, to the memory circuit 11. The write address/control signal as used herein means a signal indicative of a write address and a control signal used to write the data into the memory circuit 11. The written data is the data actually written into the memory circuit 11. The read address/control signal as used herein means a signal indicative of a read address and a control signal used to read the data out of the memory circuit 11. The write address/control signal, the written data, and the read address/control signal are supplied to the memory circuit 11 as well as the signal sampling circuit 20 outside the information processing apparatus 10.

The inventive feature of monitoring the data is mainly achieved by the combination of the signal sampling circuit 20, the mirror memory circuit 30, the sampling memory circuit 40, and the external data processing module 50. More specifically, this feature of the invention allows monitoring of the data exchanged between the memory controller 12 and the memory circuit 11 in the information processing apparatus 10 on which the software product is run. A developer of the software product can determine, based on the monitoring results, whether the software product in execution or under development uses resources of the memory circuit 11 efficiently.

The signal sampling circuit 20 corresponds to the transfer unit of the present invention. The signal sampling circuit 20 serves to transfer the data received from the information processing apparatus 10, the mirror memory circuit 30, the sampling memory circuit 40, and the external data processing module 50 to either one or some of these components. For example, the data received from the information processing apparatus 10 is transferred to the mirror memory circuit 30 and the sampling memory circuit 40. The data received from the mirror memory circuit 30 is transferred to the sampling memory circuit 40. The data received from the sampling memory circuit 40 is transferred to the external data processing module 50, while the data received from the external data processing module 50 is transferred to the sampling memory circuit 40. The transfer paths are determined previously.

The mirror memory circuit 30 is a kind of mirror component that is an exact "replica" or "copy" of the memory circuit 11 in the information processing apparatus 10. In other words, the mirror memory circuit 30 operates in exactly the same manner as the memory circuit 11 and maintains an exact duplicate of all data stored in the memory circuit 11 in the same relative addresses, reflecting the data structure of the memory circuit 11.

The mirror memory circuit 30 receives through the signal sampling circuit 20 the write address/control signal, the written data, and the read address/control signal that are supplied from the memory controller 12 in the information processing apparatus 10 to the memory circuit 11. The write address/control signal is used to write the data in question into the mirror memory circuit 30 in the same relative addresses as in the memory circuit 11. The read address/control signal serves to read the data from the same relative addresses of the mirror memory circuit 30 as in the memory circuit 11. As is apparent from the above, the same data is written into and read out of the mirror memory circuit 30 as is written into and read out of the memory circuit 11. The data read out of the mirror memory circuit 30 is hereinafter referred to as "read data". Furthermore, the data is written into and read out of the mirror memory circuit 30 in synchronization with the writing of data into and reading of data out from the memory circuit 11.

Similar to the transmission line between the memory circuit 11 and the memory controller 12 in the information processing apparatus 10, the transmission line between the signal sampling circuit 20 and the mirror memory circuit 30 is terminated at only one end. More specifically, termination is placed only on the mirror memory circuit 30.

The sampling memory circuit 40 stores, in chronological order, the data supplied from the information processing apparatus 10 through the signal sampling circuit 20 and the data supplied from the mirror memory circuit 30 through the signal sampling circuit 20. For example, the sampling memory circuit 40 stores the write address/control signal, the written data, and the read address/control signal received from the information processing apparatus 10, or the read data supplied from the mirror memory circuit 30. As described above, the read data supplied from the mirror memory circuit 30 is the same as the data read out of the memory circuit 11. This means that the data stored in the sampling memory circuit 40 is the same as the data obtained by means of monitoring the data exchanged between the memory controller 12 and the memory circuit 11. The data sampled in the sampling memory circuit 40 is hereinafter referred to as "sampled data".

The external data processing module 50 may be a computer system, such as a personal computer, that can be used to analyze the sampled data read out of the sampling memory circuit 40. For the analysis of the sampled data, the external data processing module 50 sends a request to the sampling memory circuit 40 through the signal sampling circuit 20 to obtain the necessary sampled data.

Figure 2:
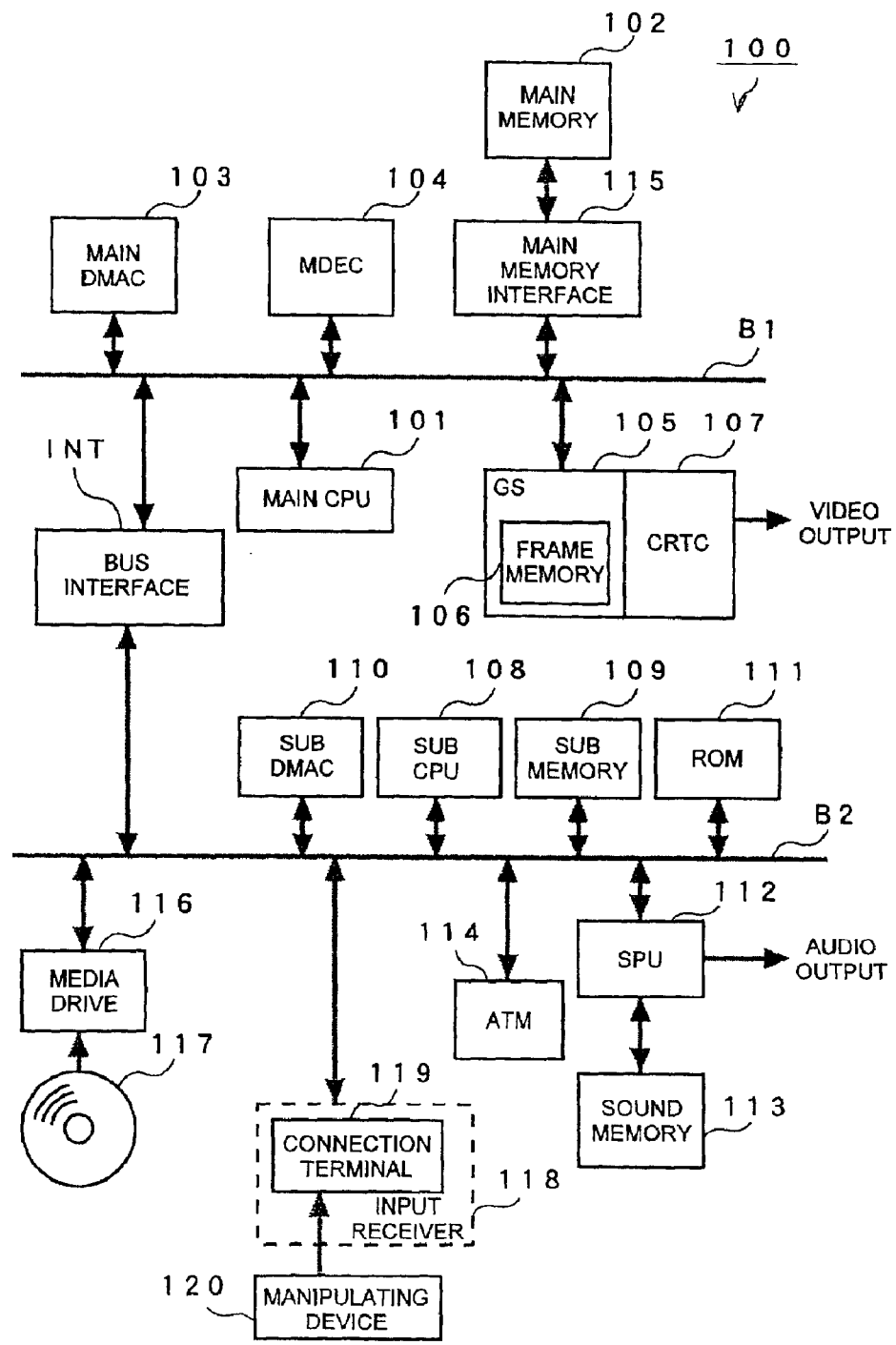
FIG. 2 is a block diagram illustrating a configuration of an entertainment console as an example of an information processing apparatus.

The information processing apparatus 10 may have a configuration as shown in FIG. 2 which is a block diagram illustrating an entertainment console 100 on which entertainment operations are carried out by the above-mentioned software product. The entertainment console 100 comprises a dual bus structure having a main bus B1, a sub bus B2, and a bus interface INT. The bus interface INT allows communications between the main bus B1 and the sub bus B2. The main bus B1 is connected to a main CPU 101, a main memory interface 115, a main direct memory access controller (DMAC) 103, a Motion Picture Experts Group (MPEG) decoder (MDEC) 104, and a graphics synthesizer (GS) 105. The main memory interface 115 is for access to a main memory 102 formed of a RAM. The main memory 102 is the equivalent of the memory circuit 11 in FIG. 1, and the main memory interface 115 is the equivalent of the memory controller 12 in FIG. 1. They are comprised of a semiconductor device having one or more semiconductor cells. The graphics synthesizer 105 has a frame memory 106 therein, and is associated with a CRT controller (CRTC) 107 that produces video output signals.

When the entertainment console 100 is turned on, the main CPU 101 loads a boot program from the ROM 111 on the sub bus B2 through the bus interface INT and starts executing the boot program to invoke the operating system. In addition, the main CPU 101 controls the media drive 116 to read application programs and/or digital information consisting of data out of the media 117 loaded on the media drive 116. The main CPU 101 stores the application programs in the main memory 102. The main CPU 101 also performs geometry processing on the data read out of the media 117. For example, the main CPU 101 performs geometry processing on coordinates of the vertexes of two or more polygons making up a 3D object. The geometry processing is an arithmetic operation involving the coordinates of the vertexes and is used to generate the display list to be used in image processing at a subsequent stage. The display list is a group of information used to identify graphics context including drawing area defining information and polygon information. The drawing area defining information is used for defining a drawing area for a graphic image to be displayed. The drawing area defining information comprises offset coordinates within a frame memory for the drawing area and coordinates of a drawing clipping region that limits the effect of drawing operations. When the coordinates of a polygon (drawing object) to be drawn fall outside the clipping region, drawing of the corresponding portion of the polygon has no effect.

The polygon information is a group of components that make up a graphic image to be drawn. More specifically, the polygon information comprises information about the attributes of the polygon and information about the vertex. The information the attributes of the polygon is used to specify either one of shading, alpha-blending, texture mapping, and bump mapping operations (which are known in the art). The information about the vertex represents the color of the vertex as well as the coordinates of the polygon vertexes within the drawing area and within the texture region.

The graphics synthesizer 105 reads the relevant drawing context in accordance with the identification information for the graphics context contained in the display list supplied from the main CPU 101. The graphics synthesizer 105 then draws an object into the frame memory 106 with the drawing context. This drawing process is called "rendering". The frame memory 106 may also be used as a texture memory. More specifically, the pixel images in the frame memory 106 may be placed on the surface of the polygon (3D objects) as textures.

The main DMAC 103 controls the DMA transfer of the data among the parts on the main bus B1. When the bus interface INT interconnects the sub bus B2 and the main bus B1, the main DMAC 103 also controls the DMA transfer of the data among the parts on the sub bus B2 as well. The MDEC 104 operates in parallel with the main CPU 101 and decodes the data compressed in the Motion Picture Experts Group (MPEG) format or the Joint Photographic Experts Group (JPEG) format.

The sub bus B2 is connected to a sub CPU 108 containing a microprocessor, a sub memory 109 formed of a random-access memory (RAM), a sub DMAC 110, a read-only memory (ROM) 111 in which programs such as the operating system are stored, a sound processing unit (SPU) 112, an ATM communication controller 114, a media drive 116, and an input receiver 118. The sound processing unit 112 reads audio data out of a sound memory 113 and produces it as an audio output. The ATM communication controller 114 controls communications with external devices through a network. The media drive 116 is for reading the data on a medium, such as a CD-ROM or a DVD-ROM, or writing data onto them. As in the parts described in conjunction with FIG. 1, these parts are also comprised of a semiconductor device having one or more semiconductor cells.

The sub CPU 108 carries out necessary operations based on or in accordance with the digital information (e.g., programs and data) stored in the ROM 111. The sub DMAC 110 controls the DMA transfer of the data among the parts on the main bus B2 only when the bus interface INT separates the main bus B1 and the sub bus B2. The input receiver 118 comprises a connection terminal 119 where an input signal is received from a manipulating device 120.

Figure 3:
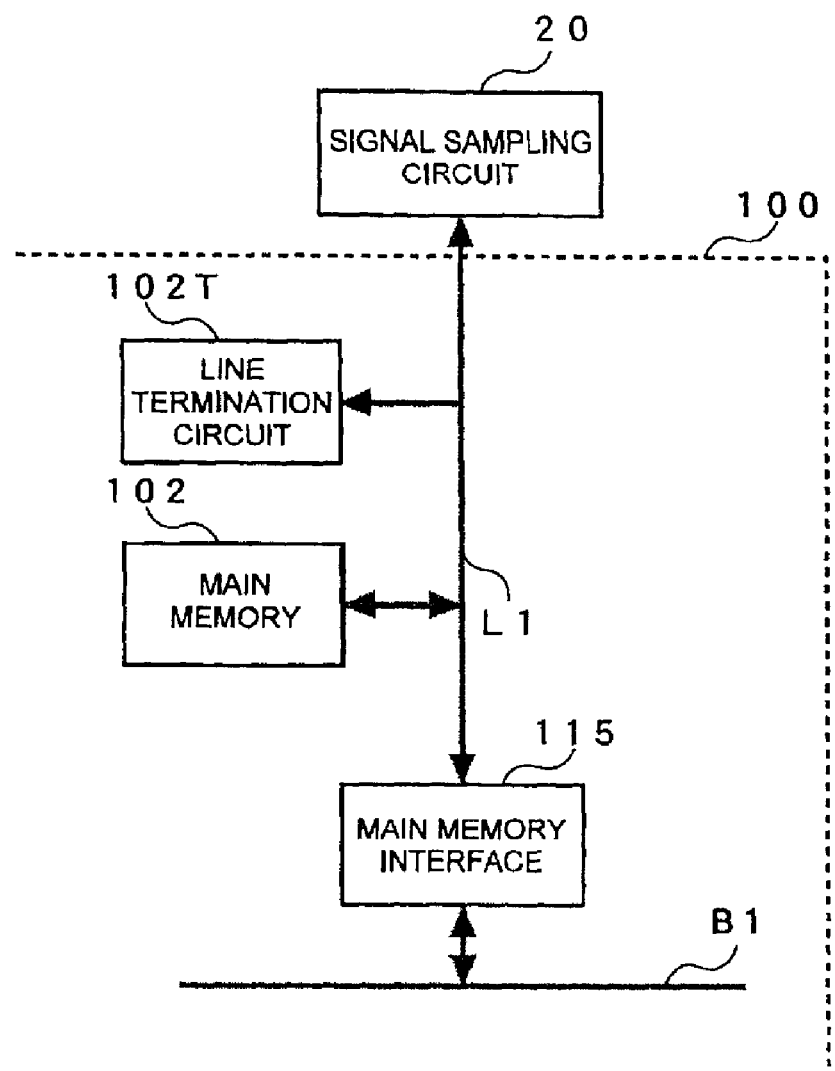
FIG. 3 is a block diagram for showing interconnections between an entertainment console and a signal sampling circuit.

In this embodiment, a line termination circuit 102T and the signal sampling circuit 20 are connected to a line L1, which links the main memory interface 115 and the main memory 102, on the side of the main memory 102 as shown in FIG. 3, when the entertainment console 100 is operated. The signal sampling circuit 20 is connected closer to the main memory interface 115 than the line termination circuit 102T. The line termination circuit 102T functions to match the characteristic impedance of the line L1. The line termination circuit 102T thus makes it possible to monitor, without any deformation, the data transmitted from the main memory interface 115 toward the main memory 102.

<Data Processing>

Figure 4:
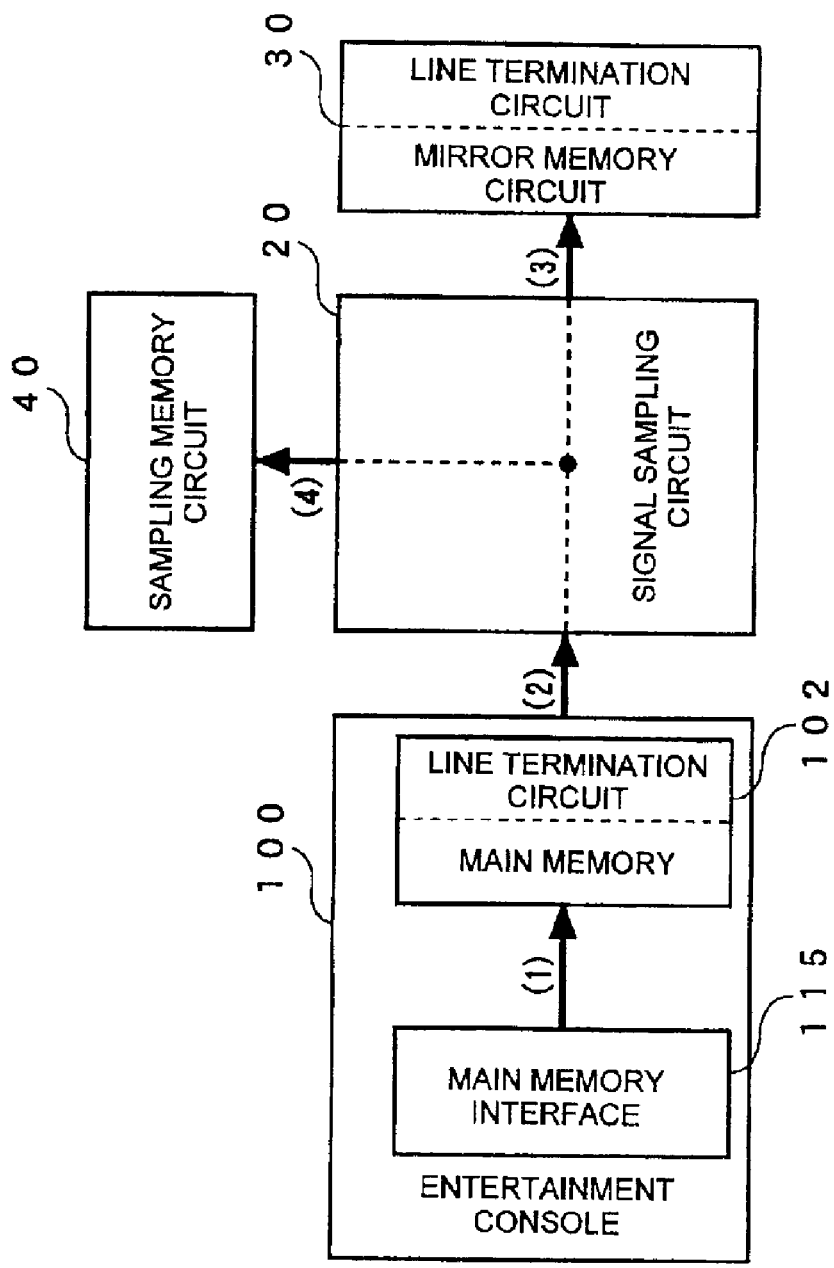
FIG. 4 is a block diagram for showing the data flow during writing of data into a main memory.

Referring to FIGS. 4 to 7, description is made in conjunction with data processing, in particular, the processing of the data to be monitored, that is carried out by the electronic machine 1 for the development of software products according to the embodiment of the present invention having the configuration as described above. In FIGS. 4 and 5, the entertainment console 100 is equivalent to the information processing apparatus 10 in FIG. 1. Likewise, the main memory interface 115 and the main memory 102 in the entertainment console 100 are equivalent to the memory controller 12 and the memory circuit 11, respectively, in FIG. 1.

For the sake of simplicity and clarity of the description, the data processing herein is classified into the following three categories: writing the data into the main memory 102, reading the data out of the main memory 102, and reading the sampled data.

(Writing the Data: FIG. 4)

As shown in FIG. 4, the data is written from the main memory interface 115 to the main memory 102 through the first line L1 (1). The subject data in this case are the write address/control signal and the written data. The written data may be a display list generated by the above-mentioned geometry processing. The written data is written into the main memory 102 in the address designated by the write address under the control of the write control signal.

The write address/control signal and the written data are also supplied to the signal sampling circuit 20 through a second line L2 (2). The signal sampling circuit 20 transfers the received data to the mirror memory circuit 30 and the sampling memory circuit 40 (3), (4).

In the mirror memory circuit 30, the written data is written in the address in the mirror memory (not shown) designated by the write address under the control of the write control signal. The sampling memory circuit 40 stores the received data in the sampling memory (not shown).

The sampling memory circuit 40 stores, for the subsequent monitoring, all the data that are associated with writing and supplied from the main memory interface 115 to the main memory 102. The mirror memory circuit 30 is terminated at the corresponding location to the main memory 102, and consequently, the mirror memory circuit 30 and the sampling memory circuit keep the data having exactly the same waveform as those stored in the main memory 102.

(Reading the Data: FIG. 5)

Next, how the data are processed is described with reference to FIGS. 5A and 5B in conjunction with the case where the main memory interface 115 reads the data out of the main memory 102.

Figure 5A:
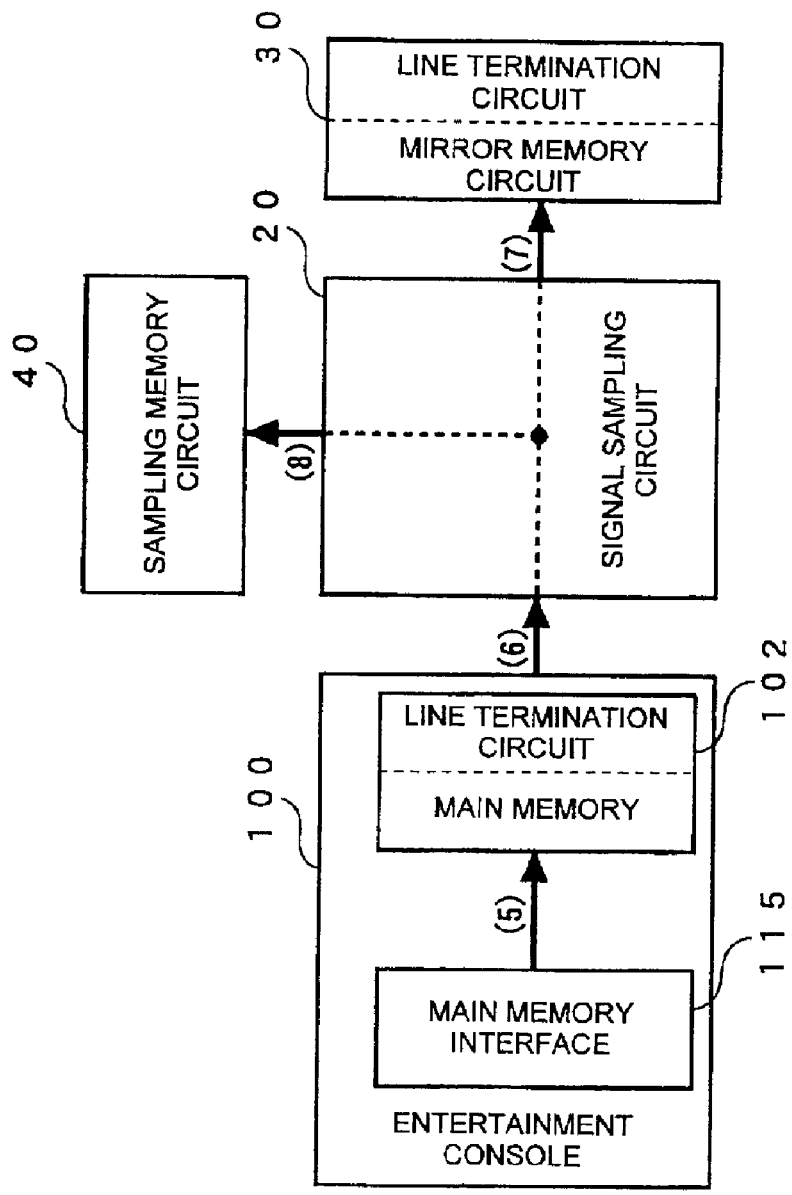
FIG. 5A is a block diagram for showing the data flow from a main memory interface during reading of data out of a main memory.

As shown in FIG. 5A, the read address/control signal is supplied from the main memory interface 115 in the entertainment console 100 to the main memory 102 and the signal sampling circuit 20 (5), (6). The signal sampling circuit 20 transfers the received read address/control signal to the mirror memory circuit 30 and the sampling memory circuit 40 (7), (8).

Figure 5B:
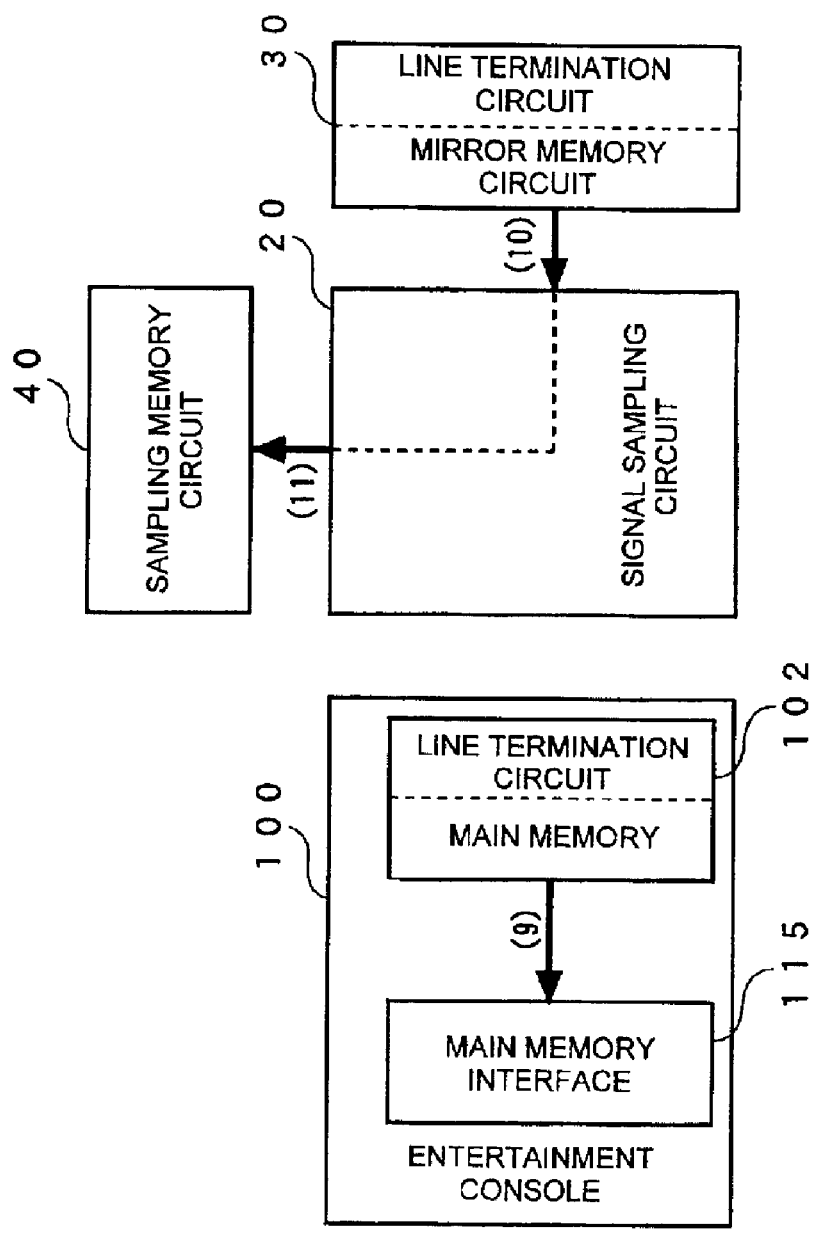
FIG. 5B is a block diagram for showing the data flow from a main memory and a mirror memory circuit during reading of data out of the main memory.

When the read address/control signal is supplied to the main memory 102, the mirror memory circuit 30, and the sampling memory circuit 40, the data is transmitted as indicated in FIG. 5B.

More specifically, the data is read out of the main memory 102 from the address designated by the read address under the control of the control signal. The data is then supplied to the main memory interface 115 (9). The data is read out of the mirror memory circuit 30 from the address designated by the read address under the control of the control signal. The read data is then supplied to the signal sampling circuit 20 (10). The sampling memory circuit 40 stores the read address/control signal received thereby.

Subsequently, the signal sampling circuit 20 supplies the data received from the mirror memory circuit 30 to the sampling memory circuit 40 (11). The sampling memory circuit 40 stores the read data received thereby. As apparent from the above, the sampling memory circuit 40 stores the read address/control signal and the read data during the operation to read the data out of the main memory 102. Thus, the sampling memory circuit 40 stores the read address/control signal supplied from the main memory interface 115 to the main memory 102 and also stores, for monitoring purposes, the same data as that read out of the main memory 102 and supplied to the main memory interface 115 (i.e., the data read out of the mirror memory circuit 30).

The above-mentioned data processing (writing and reading of the data) during the access to the main memory 102 permits the sampling memory circuit 40 to store all the data associated with the access to the main memory 102 in chronological order. This means that the data which should be exchanged between the main memory interface 115 and the main memory 102 are sampled and stored in the sampling memory circuit 40 in the course of development of the software products.

Figure 6:
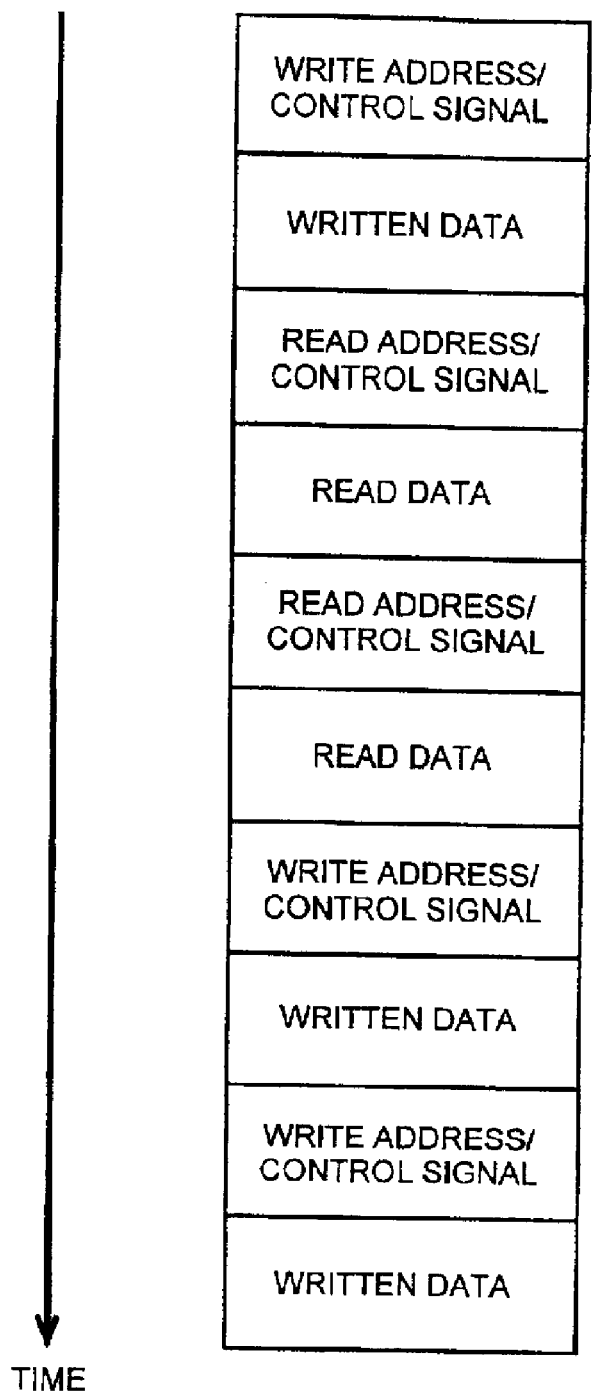
FIG. 6 is a view of sampled data obtained in an electronic machine for the development of software products.

FIG. 6 is a view of the sampled data stored in the sampling memory circuit 40. It is apparent from the sampled data in FIG. 6 that the main memory 102 is accessed to write, read, read, write, and write the data with the passage of time.

(Reading the Sampled Data)

Figure 7:
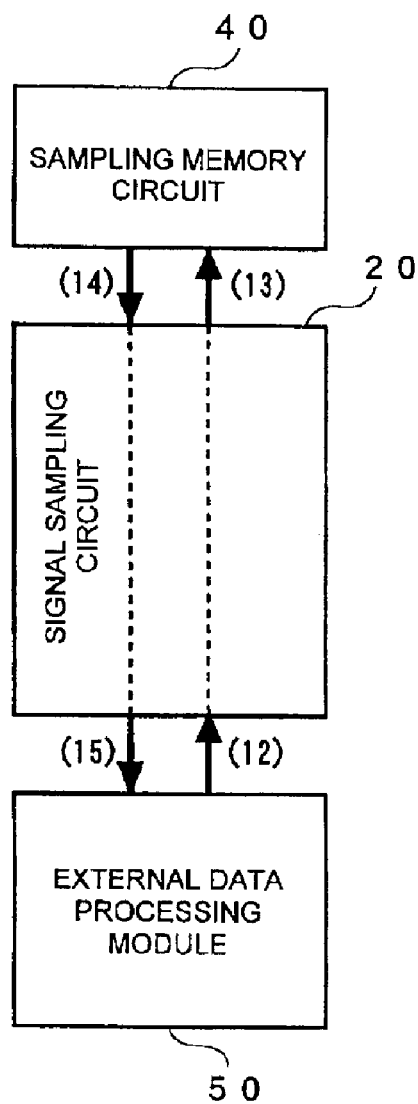
FIG. 7 is a block diagram for showing the data flow during reading of sampled data.

Next, with reference to FIG. 7, description is made in conjunction with the case where the external data processing module 50 reads the sampled data out of the sampling memory circuit 40. After completion of the sampling, the external data processing module 50 reads the sampled data stored in the sampling memory circuit 40 for the necessary analysis. To read the sampled data, the external data processing module 50 sends a request to the signal sampling circuit 20 to obtain the necessary sampled data (12). The signal sampling circuit 20 transfers the received request to the sampling memory circuit 40 (13). In response to the request, the sampling memory circuit 40 produces the sampled data stored therein (14). The sampled data produced from the sampling memory circuit 40 reaches the external data processing module 50 through the signal sampling circuit 20 (15). The external data processing module 50 receives the sampled data and analyzes the received data.

The exact nature of the data analysis varies depending on the software product being developed. As described above, the sampled data is a chronological collection of the data exchanged between the main memory interface 115 and the main memory 102. With the sampled data, it is possible to know to which address or from which address in the main memory 102 the data is written or read and in what order. The memory access conditions may be, for example, extracted as a Merkmal for the development of software products. The external data processing module 50 displays the read sampled data and/or the results of the data analysis as desired and appropriate.

<Practical Application>

A practical application is described for the case where the above-mentioned electronic machine 1 for the development of software products is used to develop a software product. A developer is assumed to be involved in the development of the software product to be operated on the entertainment console 100. The developer runs the software product on the entertainment console 100. In response to this, the data exchanged between the main memory interface 115 and the main memory 102 are stored in the sampling memory circuit 40 in the manner described above.

After completion of the sampling, the external data processing module 50 reads the sampled data out of the sampling memory circuit 40. The sampled data is subjected to the necessary analysis and indicated on, for example, a display screen. The indication permits the developer to keep track of how frequently the main memory 102 is accessed during the execution of the software product under development. This provides the developer with information about the maximum load expected to be applicable to the main memory 102. With that information, the developer can tune the software product easily. The present invention offers excellent support for developing software products.

As described above, in the monitoring system 1 according to this embodiment, there are provided the mirror memory circuit 30 that is an exact "replica" or "copy" of the main memory 102 in function and in operation, the sampling memory circuit 40 that stores in chronological order the data received thereby, and the signal sampling circuit 20 in order to monitor the data transmitted between the part (i.e., the main memory 102) present at the terminated end of the single-end terminated transmission line and the part (i.e., the main memory interface 115 in the entertainment console 100) present at the opposite end of the line. The signal sampling circuit 20 supplies to the mirror memory circuit 30 and the sampling memory circuit 40 the same data as that read out from the main memory interface 115 to the main memory 102. The signal sampling circuit 20 also supplies to the sampling memory circuit 40 the same data as that transmitted from the mirror memory circuit 30. The signal sampling circuit 20 and the mirror memory circuit 30 are interconnected through a transmission line that is terminated only on the side of the mirror memory circuit 30. Consequently, the data read out of the mirror memory circuit 30 is doubled in amplitude in the sampling memory circuit 40 due to the effects of reflection. However, it is possible to monitor accurately the logic (HIGH/LOW) of the digital signal.

While the present invention has thus been described in conjunction with the case where the data exchanged between the main memory interface 115 and the main memory 102 is monitored, the present invention is not limited to such specific embodiment. Instead, the present invention may be applied to any electronic machines and systems where it is impossible to monitor the data transmitted among parts connected through single-end terminated transmission lines. In such a case, the data supplied to and from a given part of the system/electronic machine can be monitored by means of providing a mirror component that operates in exactly the same manner as the given part.

In the above-mentioned embodiment, all features of the monitoring system 1 are implemented by using semiconductor devices and electronic circuitry therein. However, features equivalent to all or some of these features may be implemented as a combination of a general-purpose computer and a computer program. More specifically, a computer may load the computer program stored on a data storage medium and execute that program to provide the features of the monitoring system 1 in the computer.

As is apparent from the above, according to the present invention, the data holding unit stores the data that are actually transmitted among the parts connected through the single-end terminated transmission lines. This makes it possible to monitor the data on the transmission lines easily and accurately.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for monitoring data transmitted between first and second components of an electronic machine, the first and second components being connected to one another by a transmission line having a terminated end connected to the second component and a non-terminated end, said system comprising:

a mirror component that operates in the same manner as the second component;

a data storage unit operable to store incoming data in chronological order; and a transfer unit separately provided from the first component and operable to receive first data comprising read and write control data and write data transmitted from the first component to the second component during read and write operations from and to the second component and to transfer said first data to said mirror component and said data storage unit, said transfer unit being further operable to receive second data comprising mirror read data supplied from said mirror component corresponding to read data obtained from the second component during read operations and to transfer said second data to said data storage unit, said incoming data comprising said first and second data;

said transfer unit and said mirror component being connected to one another through a transmission line having a terminated end connected to said mirror component and a non-terminated end.

2. A system as claimed in claim 1, wherein the second component comprises a memory circuit having storage addresses for storing data generated in the first component, the memory circuit writing the generated data to and reading the generated data from the storage addresses, and wherein the mirror component comprises a mirror memory circuit having the same relative addresses as said memory circuit, said mirror memory circuit writing said generated data in the same relative addresses as said generated data are written in said memory circuit, and said mirror memory circuit reading said generated data from the same relative addresses as said generated data are read from said memory circuit.

3. A system as claimed in claim 1, further comprising:

a data analyzing unit operable to analyze said data stored in said data storage unit, wherein said transfer unit is operable to read data out of said data storage unit and to send said read data to said data analyzing unit in response to a request from said data analyzing unit.

4. A system as claimed in claim 3, wherein the second component comprises a memory circuit having storage addresses for storing data generated in the first component, said memory circuit writing said generated data to and reading said generated data from said storage addresses, and wherein said mirror component comprises a mirror memory circuit having the same relative addresses as said memory circuit, said mirror memory circuit writing said generated data in the same relative addresses as said generated data are written in said memory circuit, and said mirror memory circuit reading said generated data from the same relative addresses as said generated data are read from said memory circuit.

5. A system as claimed in claim 1, wherein said mirror component is operable to supply said second data to said transfer unit in synchronization with the transmission of data from the second component to the first component.

6. A system as claimed in claim 5, wherein the second component comprises a memory circuit having storage addresses for storing data generated in the first component, said memory circuit writing said generated data to and reading said generated data from said storage addresses, and wherein said mirror component comprises a mirror memory circuit having the same relative addresses as said memory circuit, said mirror memory circuit writing said generated data in the same relative addresses as said generated data are written in said memory circuit, and said mirror memory circuit reading said generated data from the same relative addresses as said generated data are read from said memory circuit.

7. A system for monitoring data transmitted between first and second components of an electronic machine, the first and second components being connected to one another by a transmission line having a terminated end connected to the second component and a non-terminated end, said system comprising:

a mirror component that operates in the same manner as the second component;

a data storage unit operable to store incoming data in chronological order;

a data analyzing unit operable to analyze said data stored in said data storage unit; and a transfer unit separately provided from the first component and interconnecting the electronic machine, said mirror component, said data storage unit and said data analyzing unit, said transfer unit being operable to supply to said mirror component and said data storage unit first data comprising read and write control data and write data transmitted from the first component to the second component during read and write operations from and to the second component, to supply to said data storage unit second data comprising mirror read data supplied from said mirror component corresponding to read data obtained from the second component during read operations, and to supply to said data analyzing unit said first and second data stored in said data storage unit.

8. A system as claimed in claim 7, wherein the second component comprises a memory circuit having storage addresses for storing data generated in the first component, said memory circuit writing said generated data to and reading said generated data from said storage addresses, and wherein said mirror component comprises a mirror memory circuit having the same relative addresses as said memory circuit, said mirror memory circuit writing said generated data in the same relative addresses as said generated data are written in said memory circuit, and said mirror memory circuit reading said generated data from the same relative addresses as said generated data are read from said memory circuit.

9. A system as claimed in claim 7, wherein said mirror component is operable to supply data to said transfer unit in synchronization with the transmission of data from the second component to the first component.

10. A system as claimed in claim 9, wherein the second component comprises a memory circuit having storage addresses for storing data generated in the first component, said memory circuit writing said generated data to and reading said generated data from said storage addresses, and wherein said mirror component comprises a mirror memory circuit having the same relative addresses as said memory circuit, said mirror memory circuit writing said generated data in the same relative addresses as said generated data are written in said memory circuit, and said mirror memory circuit reading said generated data from the same relative addresses as said generated data are read from said memory circuit.

11. A method for monitoring data, comprising:
 providing a transmission line having a terminated end and a non-terminated end;
 providing a first component connected to the non-terminated end of the transmission line;
 providing a second component connected to the terminated end of the transmission line;
 providing a transfer unit separate for the first component at the terminated end of the transmission line, the transfer unit being operable to interconnect a mirror component, a data storage unit, and a data analyzing unit, the mirror component being operated in the same manner as the second component, the data storage unit being operable to store incoming data in chronological order, and the data analyzing unit being operable to perform an analysis of the data stored in the data storage unit;
 transmitting first data comprising read and write control data and write data sent from the first component to the second component during read and write operations to and from the second component;
 supplying the first transmitted data through the transfer unit to the mirror component and the data storage unit;
 supplying second data produced from the mirror component to the data storage unit, the second data comprising mirror read data corresponding to read data obtained from the second component during read operations;
 reading the first and second data stored in the data storage unit;
 supplying the read first and second data to the data analyzing unit; and
 analyzing the read first and second data.

12. A method for monitoring data transmitted between a first component of an electronic machine and a storage component of the electronic machine, the first component and the storage component being connected to one another by a transmission line having a terminated end connected to the storage component and a non-terminated end, the method comprising:
 transmitting data comprising read and write control data and write data sent from the first component to the storage component during read and write operations to and from the storage component;
 supplying the transmitted data via a transfer unit to a first storage unit which operates in the same manner as the storage component and to a second storage unit, the transfer unit being separately provided from the first component;
 supplying read data produced from the first storage unit to the second storage unit via the transfer unit, the read data comprising mirror read data corresponding to read data obtained from the second component during read operations; and
 analyzing the read and write control data and the read and write data stored in the second storage unit.

13. A recording medium recorded with a computer program for causing a computer to carry out steps, the computer being connected to a transmission line having a terminated end and a non-terminated end, the transmission line being connected to a first component at the non-terminated end thereof and to a second component at the terminated end thereof, the computer being present at the terminated end of the transmission line, the computer being connected to a transfer unit separately provided from the first component, a mirror component, a data storage unit, and a data analyzing unit, the mirror component being operated in the same manner as the second component, the data storage unit being operable to store incoming data in chronological order, and the data analyzing unit being operable to analyze the data stored in the data storage unit, the computer program causing the computer to carry out the steps of:
 supplying to the mirror component and the data storage unit data transmitted from the first component to the second component via the transfer unit, the transmitted data comprising read and write control data and write data sent from the first component to the second component during read and write operations to and from the storage component;
 supplying to the data storage unit data produced from the mirror component via the transfer unit, said produced data comprising mirror read data corresponding to read data obtained from the second component during read operations; and
 supplying the transmitted and produced data stored in the data storage unit to the data analyzing unit.

14. The method as claimed in claim 12, wherein the read and write control data and the read and write data are stored chronologically in the second storage unit.

15. The method as claimed in claim 13, wherein the read and write control data and the read and write data are stored chronologically in the second storage unit.

* * * * *